(12) United States Patent
Bolender et al.

(10) Patent No.: US 8,305,359 B2
(45) Date of Patent: Nov. 6, 2012

(54) CAPACITIVE SENSING DEVICE FOR USE IN A KEYPAD ASSEMBLY

(75) Inventors: Robert J. Bolender, Davis, CA (US); Benjamin C. Rubenson, San Jose, CA (US)

(73) Assignee: Synaptics Incorporated, Santa Clara, CA (US)

( * ) Notice: Subject to any disclaimer, the term of this patent is extended or adjusted under 35 U.S.C. 154(b) by 698 days.

(21) Appl. No.: 12/390,374

(22) Filed: Feb. 20, 2009

(65) Prior Publication Data

US 2009/0160682 A1    Jun. 25, 2009

Related U.S. Application Data

(63) Continuation of application No. 10/635,748, filed on Aug. 5, 2003, now abandoned.

(51) Int. Cl.
*G09G 5/00* (2006.01)
(52) U.S. Cl. ........................................ 345/174; 345/173
(58) Field of Classification Search .................. None
See application file for complete search history.

(56) References Cited

U.S. PATENT DOCUMENTS

| | | |
|---|---|---|
| 4,028,509 A | 6/1977 | Zurcher |
| 4,550,310 A | 10/1985 | Yamaguchi et al. |
| 5,305,017 A | 4/1994 | Gerpheide |
| 5,341,133 A | 8/1994 | Savoy et al. |
| 5,349,303 A | 9/1994 | Gerpheide |
| 5,543,590 A | 8/1996 | Gillespie et al. |
| 5,565,658 A | 10/1996 | Gerpheide et al. |
| 5,675,361 A | 10/1997 | Santilli |
| 5,757,368 A | 5/1998 | Gerpheide et al. |
| 5,767,457 A | 6/1998 | Gerpheide et al. |
| 5,869,790 A | 2/1999 | Shigetaka et al. |
| 5,909,210 A | 6/1999 | Knox et al. |
| 5,917,165 A | 6/1999 | Platt et al. |
| 5,917,906 A | 6/1999 | Thorton |
| 5,926,171 A | 7/1999 | Matsufusa et al. |
| 6,002,594 A | 12/1999 | Ledin et al. |
| 6,028,591 A | 2/2000 | Lueders |
| 6,054,979 A | 4/2000 | Sellers |
| 6,137,427 A | 10/2000 | Binstead |
| 6,188,391 B1 | 2/2001 | Seely et al. |
| 6,243,080 B1 | 6/2001 | Molne |
| 6,664,489 B2 | 12/2003 | Kleinhans et al. |
| 6,704,005 B2 | 3/2004 | Kato et al. |

(Continued)

FOREIGN PATENT DOCUMENTS

DE          4222940          1/1994

(Continued)

*Primary Examiner* — Joseph Haley

(57) ABSTRACT

One embodiment in accordance with the present invention includes a capacitive sensing device for use in a keypad assembly of an electronic system. The capacitive sensing device includes a substantially transparent single sheet capacitive sensor. The substantially transparent single sheet capacitive sensor is configured to be disposed within the keypad assembly without requiring the formation of key post holes therethrough. Additionally, the substantially transparent single sheet capacitive sensor has a flexibility which enables desired tactile response during use of keys of the keypad assembly.

33 Claims, 14 Drawing Sheets

U.S. PATENT DOCUMENTS

| | | |
|---|---|---|
| 6,924,789 B2 | 8/2005 | Bick |
| 6,970,160 B2 * | 11/2005 | Mulligan et al. ............. 345/173 |
| 6,972,575 B2 | 12/2005 | Lambert et al. |
| 7,129,935 B2 | 10/2006 | Mackey |
| 7,202,859 B1 | 4/2007 | Speck et al. |
| 7,463,246 B2 | 12/2008 | Mackey |
| 2002/0021280 A1 | 2/2002 | Kato et al. |
| 2002/0049070 A1 | 4/2002 | Bick |
| 2002/0180707 A1 | 12/2002 | Sato et al. |
| 2003/0025679 A1 | 2/2003 | Taylor et al. |
| 2003/0030628 A1 | 2/2003 | Sato et al. |
| 2003/0234770 A1 | 12/2003 | MacKey |
| 2008/0264699 A1 | 10/2008 | Chang et al. |

FOREIGN PATENT DOCUMENTS

| | | |
|---|---|---|
| EP | 1179767 | 2/2002 |
| EP | 1197835 | 4/2002 |
| GB | 2402105 | 12/2004 |
| WO | WO-9805025 | 2/1998 |
| WO | WO-01/27868 | 4/2001 |
| WO | WO-02100074 | 12/2002 |

* cited by examiner

1000

CAPACITIVE SENSING DEVICE FOR USE IN A KEYPAD ASSEMBLY

RELATED APPLICATIONS

This application is a continuation of and claims the benefit of U.S. patent application Ser. No. 10/635,748 filed on Aug. 5, 2003 now abandoned entitled "CAPACITIVE SENSING DEVICE FOR USE IN A KEYPAD ASSEMBLY" by Robert J. Bolender et al., which is assigned to the assignee of the present invention, and is hereby incorporated by reference in its entirety.

BACKGROUND

Currently there are at least two different techniques that a user of a mobile telephone can utilize in order to input text messages. The first technique is to utilize the numeric input buttons of the mobile phone to input characters, which can be slow and tedious considering that some characters and techniques involve several key depressions per character. A second technique is for the mobile phone to be enabled with a capacitive sensor and character recognition abilities such that its user is able to gesture or "write" with his or her finger over its buttons (without depressing the buttons) in order to input alphanumeric characters. This provides a quicker way for entering text into a mobile phone. Additionally, gestures can also be used to navigate through the mobile phone operating system and/or menus. However, there are disadvantages to the conventional techniques for fabricating the capacitive sensors associated with the finger gesture input.

For example, a conventional technique is described in PCT publication WO 02/100074 (the U.S. relative is published as US 2003/0025679) in which the capacitive sensor of a mobile phone includes holes to allow keypad posts to pass through in order to activate switches associated with depressed keys. One of the disadvantages of this conventional technique is that it involves a lot of compensation in the sensing circuitry of the capacitive sensor to accommodate the irregular sensor design associated with routing around the holes. As such, this type of capacitive sensor can require increased development effort, time, and expense to adapt to different electronic devices, since the compensation usually has to be customized for each hole layout, and reconfigured when the key post holes are rearranged.

The present invention may address one or more of the above issues.

SUMMARY

One embodiment in accordance with the present invention includes a capacitive sensing device for use in a keypad assembly of an electronic system. The capacitive sensing device includes a substantially transparent single sheet capacitive sensor. The substantially transparent single sheet capacitive sensor is configured to be disposed within the keypad assembly without requiring the formation of key post holes therethrough. Additionally, the substantially transparent single sheet capacitive sensor has a flexibility which enables desired tactile response during use of keys of the keypad assembly.

The drawings referred to in this description should not be understood as being drawn to scale.

DESCRIPTION OF PREFERRED EMBODIMENTS

Reference will now be made in detail to embodiments of the invention, examples of which are illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 1:
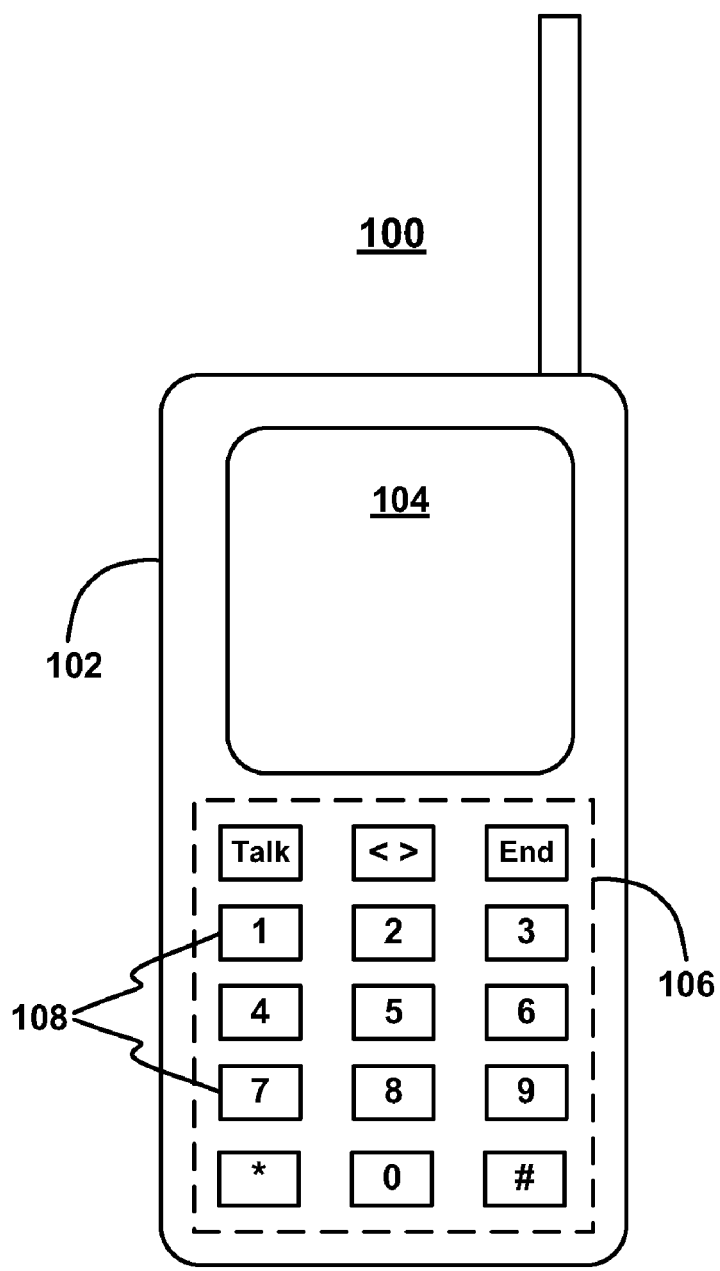
FIG. 1 is a diagram of an exemplary mobile telephone that can be implemented to include one or more embodiments of the present invention.

FIG. 1 is a diagram of an exemplary mobile telephone 100 that can be implemented to include one or more embodiments in accordance with the present invention. Specifically, a capacitive sensor (not shown) can be integrally disposed within a keypad region 106 of mobile phone 100 thereby enabling both conventional use of keys 108 of the keypad region 106 having tactile "clicking" feedback while also enabling the capture of pointing and gesturing input when a user slides his or her finger over the surface of the keypad region 106 with or without actually depressing the keys 108. For example, if a user moved his or her finger over keypad region 106 to form the letter "b", the capacitive sensor would detect this motion and its character recognition circuitry would identify the motion and subsequently the letter "b" can be presented on a display 104 of mobile phone 100. In this manner, a user of mobile phone 100 can enter alphanumeric text (or commands or other inputs) more easily with his or her finger via the capacitive sensing device than by utilizing keys 108 of keypad 106.

It is noted that, keys 108 of mobile phone 100 can be lighted from behind. As such, the capacitive sensor can be implemented such that it is substantially transparent in regions beneath the keys 108 in order to allow the light to pass from behind the capacitive sensor to light the tops of keys 108. In this manner, the lighting of the keys 108 is not significantly adversely affected by the inclusion of the capacitive sensing device that is part of keypad 106.

Figure 2:
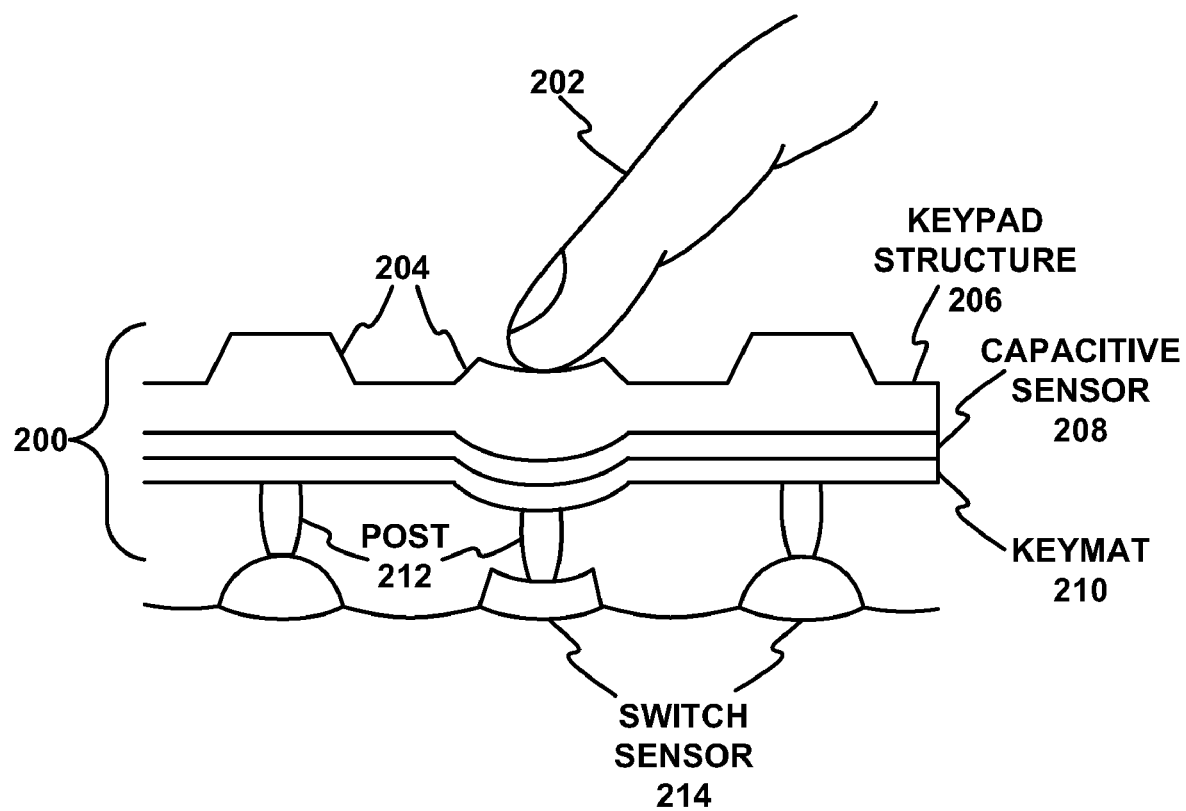
FIG. 2 is a diagram of an exemplary keypad assembly in accordance with an embodiment of the present invention.

FIG. 2 is a diagram of an exemplary keypad assembly 200 in accordance with an embodiment of the present invention. Specifically, keypad assembly 200 includes a capacitive sensor 208 that can be a thin and flexible sensor that utilizes substantially transparent components. Within one embodiment, capacitive sensor 208 can include a single sheet capacitive sensor that includes a single layer of substantially transparent conductive material, e.g., indium tin oxide (ITO), and an extra layer of substantially opaque conductive material (e.g., silver ink, carbon ink, a mixture of silver and carbon inks, etc.) that protects the substantially transparent conductive material against cracking during manufacture and/or repetitive use. Since the substantially opaque conductive material application is also a redundant electrical path, it can be selectively disposed where desired. For example, the substantially opaque conductive material could be masked around certain features in the sensing region of the capacitive sensor 208 to allow illumination to pass directly through capacitive sensor 208, thereby allowing keys 204 of keypad structure 206 to be illuminated to enable visibility of keys 204 in low light. The single sheet capacitive sensor 208 can also include a substantially transparent substrate, or the various patterns of the single sheet captive sensor 208 can be disposed on an existing component of the keypad assembly 200.

The keypad assembly 200 for an electronic device (e.g., 100) includes keypad structure 206, a keymat 210 that is deformable to actuate switch sensors 214 via key posts 212, and capacitive sensor 208 that is coupled to the keymat 210 and the keypad structure 206. In this manner, when a user finger 202 exerts a downward force on one of keys 204, that key 204 is depressed (as shown) which in turn causes the deformation of capacitive sensor 208 along with keymat 210 which results in the corresponding key post 212 actuating one or more switch sensors 214. It is noted that capacitive sensor 208 is not disposed beneath the keymat 210 such that keypad post holes do not have to be formed within capacitive sensor 208, since such holes would complicate the sensing circuit (not shown) utilized to interpret signals received from capacitive sensor 208.

In one embodiment, capacitive sensing device 208 can be bonded to the top of the keymat 210 and the keypad structure 206 can be bonded to capacitive sensing device 208. It is noted that keypad structure 206 could be many separate discrete keys that can be disposed on capacitive sensing device 208 or disposed on some intermediate member (or component) that is disposed on capacitive sensing device 208.

Within FIG. 2, capacitive sensor 208 can be integrated into the keymat 210 which in one embodiment can be implemented with some type of rubber material. The keys 204 of keypad structure 206 can be rigid plastic buttons which include both clear and opaque regions (e.g., painted on the outside with holes in the paint) to let any back lighting through for illumination. It is noted that the indicia of keys 204 can look darkened when there's no light behind them and they can also glow when the back lighting is activated such as in response to a user activating one of buttons 204 or a status change of the electronic device (e.g., 100). It is pointed out that capacitive sensor 208 can be flexible and thin enough such that it does not inhibit the tactile response associated with buttons 204. Instead, capacitive sensor 208 enables the desired tactile response of the keys 204 which may include a responsive click or snap or less resistant responses. It is noted that the keypad assembly 200 is one integral unit.

It is understood that capacitive sensor 208 includes a sensing region which can include where the buttons 204 are located on a electronic device or system (e.g., keypad region 106). However, the sensing region of capacitive sensor 208 may be any shape, may be smaller than keypad region 106, and/or may extend outside of where the buttons 204 are into areas that can be covered up by the housing of the electronic device (e.g., 100).

It is noted that a single sheet capacitive sensor can include a single substrate that has two or more conductive sensing patterns disposed thereon in a common layer that can be utilized for, but not limited to, 2-dimensional capacitive sensing.

Figure 3A:
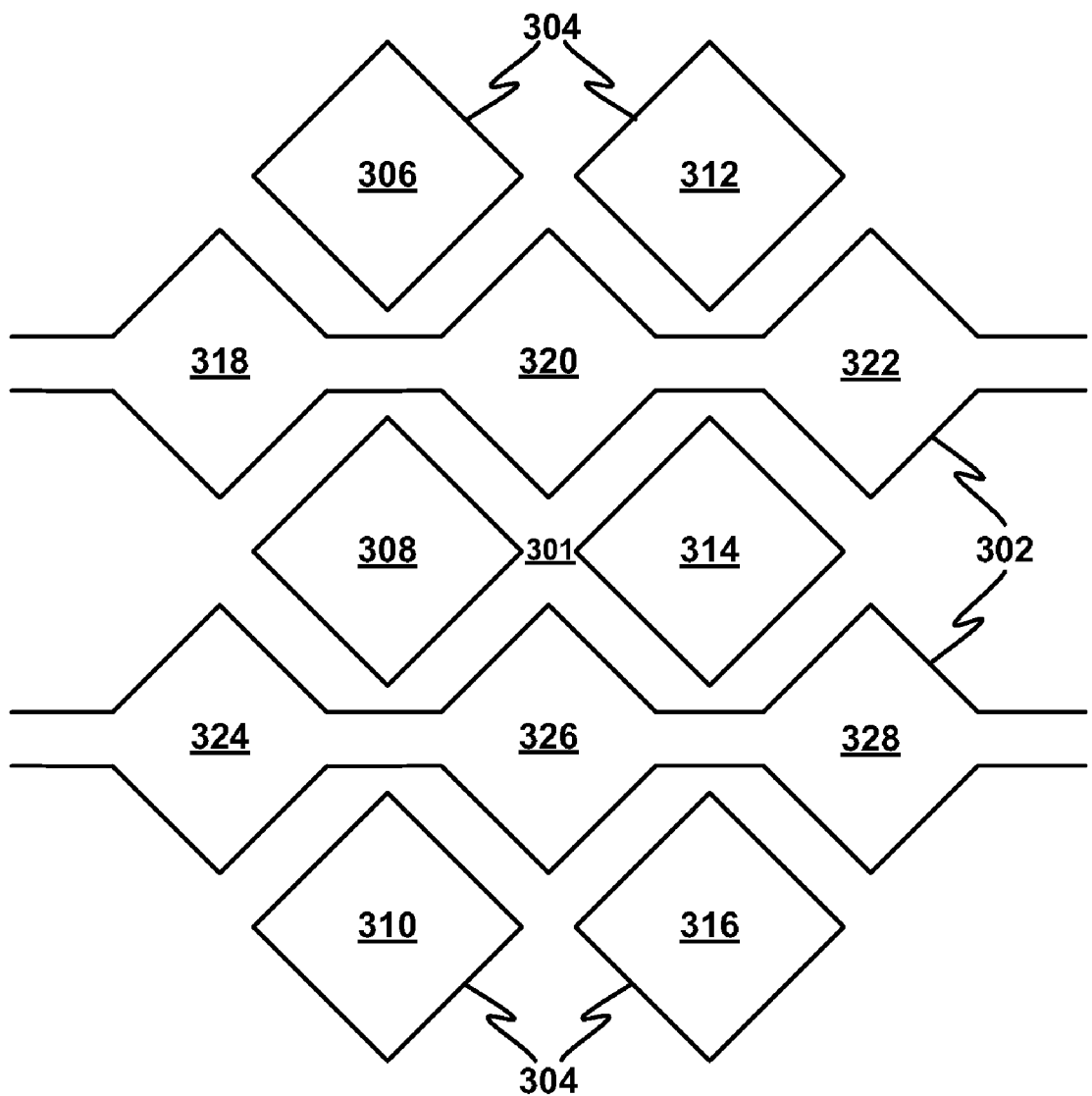
FIG. 3A is a diagram of an intermediate step in constructing an exemplary sensor that includes first and second sensor patterns in accordance with an embodiment of the present invention for a capacitive sensing device.

FIG. 3A is a diagram of an intermediate step in constructing an exemplary capacitive sensor 300A that includes a first capacitive sensor pattern 302 and a second capacitive sensor pattern 304 in accordance with an embodiment of the present invention for a capacitive sensing device. For example, capacitive sensor pattern 302 includes electrically coupled horizontal capacitive sensor traces while capacitive sensor pattern 304 includes the as yet electrically uncoupled vertical sensor traces.

It is noted that capacitive sensor patterns 302 and 304 each includes a layer of substantially transparent conductive material (not shown) along with a layer of substantially opaque conductive material (shown). There are a wide variety of ways in accordance with the present embodiment to fabricate capacitive sensor patterns 302 and 304. For example, in one embodiment a sputtering process can be used to coat one side of a substantially transparent flexible substrate 301 with a layer of substantially transparent conductive material (e.g., ITO). The substantially transparent conductive material can then be selectively etched away from the surface of the substantially transparent flexible substrate 301, revealing an intended "diamond" patterns 302 and 304 which can be used for a capacitive sensing process. Alternatively, the substantially transparent material can be applied in any manner to create the intended diamond patterns 302 and 304. It is noted that patterns 302 and 304 may include any shapes and are not limited to the "diamond" patterns or the horizontal and vertical layout shown. After the etching process of the substantially transparent conductive material, a first layer of substantially opaque conductive material is deposited on top of the substantially transparent conductive material in the desired areas. Within capacitive sensor 300A, the substantially transparent conductive material and the substantially opaque conductive material are shown having a substantial one-to-one correspondence and alignment which is why the substantially transparent conductive material is not shown.

Furthermore, it is noted that in various embodiments of the present invention, the first and second conductive sensor patterns are comprised of the same type of substantially transparent conductive material. It is further noted that in various embodiments of the present invention, the first and second conductive sensor patterns are comprised of different types of substantially transparent conductive materials. Additionally, it is noted that in various embodiments of the present invention, the first and second conductive sensor patterns are comprised of the same type of substantially opaque conductive material. It is further noted that in various embodiments of the present invention, the first and second conductive sensor patterns are comprised of different types of substantially opaque conductive materials.

Within FIG. 3A, capacitive sensor pattern 302 includes diamond shapes 318, 320, 322, 324, 326 and 328 which can be disposed on a substantially transparent flexible substrate 301 as described herein. The diamonds shapes 318, 320 and 322 of sensor pattern 302 have been disposed such that they are each electrically coupled together while diamonds shapes 324, 326 and 328 have been disposed such that they are each electrically coupled together. As such, the components of capacitive sensor pattern 302 could be utilized if coupled to capacitive sensing circuitry (not shown).

Alternatively, capacitive sensor pattern 304 includes isolated diamond shapes 306, 308, 310, 312, 314 and 316 which can be disposed on the substantially transparent flexible substrate 301 as described herein. The diamond shapes 306, 308, 310, 312, 314 and 316 are electrically isolated and are therefore not yet useful as input to capacitive sensing circuitry. However, it is pointed out that the substantially transparent conductive material of the diamond shapes of capacitive sensor patterns 302 and 304 exist with a single layer which is advantageous for fabricating a capacitive sensing device that is thin and flexible.

Within FIG. 3A, it is noted that the substantially transparent flexible substrate 301 of the present embodiment may be implemented in a wide variety of ways. For example, the substantially transparent flexible substrate 301 can be implemented with, but is not limited to, Polyethylene Terephthalate (PET). Additionally, the substantially transparent flexible substrate 301 can have a diverse range of thickness which provide a desired amount of flexibility. For example, the substantially transparent flexible substrate 301 can have a thickness of, but is not limited to, roughly 0.07 millimeters (mm). It is noted that substrate 301 may be implemented such that one or more portions of it are not substantially transparent (e.g., opaque markings, and the like). Additionally, the layer of substantially transparent conductive material of both capacitive sensor patterns 302 and 304 can be implemented with diverse materials such as, but not limited to, indium tin oxide (ITO) or any other substantially transparent conductive material. Moreover, the layer of substantially opaque conductive material can be implemented in a wide variety of ways in accordance with the present embodiment. For example, the substantially opaque conductive material can be implemented as, but not limited to, conductive ink (e.g., silver ink, carbon ink, mixture of silver and carbon inks, and the like).

Figure 3B:
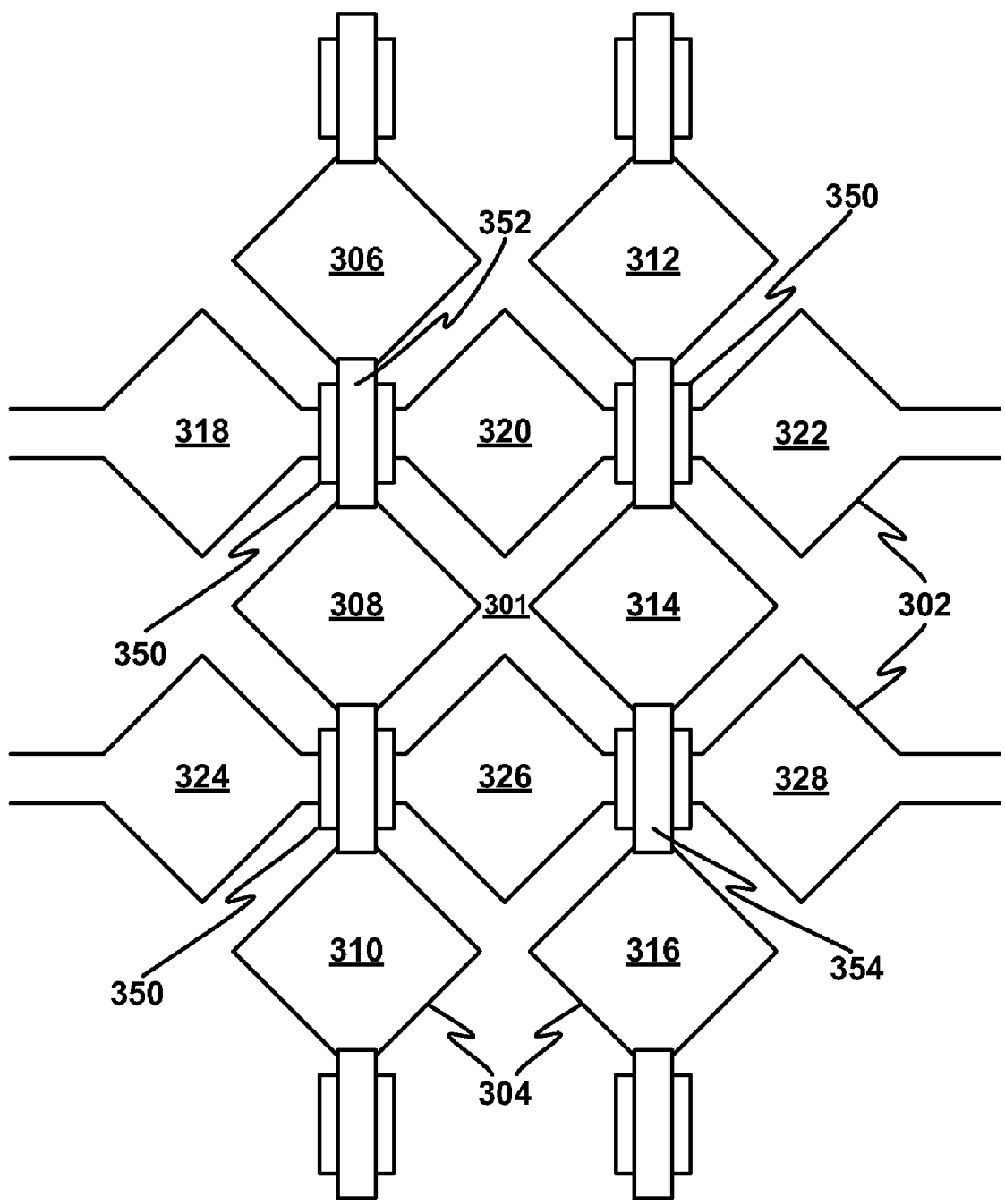
FIG. 3B is a diagram of an exemplary sensor pattern that includes conductive bridges in accordance with an embodiment of the present invention for a capacitive sensing device.

FIG. 3B is a diagram of an exemplary capacitive sensor 300B that includes conductive bridges in accordance with an embodiment of the present invention for a capacitive sensing device. Specifically, capacitive sensor 300B illustrates one embodiment of electrically coupling isolated diamonds 306, 308, 310, 312, 314 and 316 of capacitive sensor pattern 304 during a fabrication process of a capacitive sensing device.

After the operation associated with FIG. 3A have occurred as described herein, an insulator 350 can then be disposed in areas where conductive bridges (e.g., 352 and 354) of sensor pattern 304 will cross the sensor traces of sensor pattern 302 to facilitate electrically coupling of diamonds 306, 308, 310, 312, 314 and 316. For example, insulator 350 can be disposed between diamonds 310 and 308 of sensor pattern 304 and also between diamonds 308 and 306. Furthermore, insulator 350 can be disposed between diamonds 312 and 314 of sensor pattern 304 and also between diamonds 316 and 314.

Within FIG. 3B, a substantially opaque conductive material is next disposed to create conductive bridges (e.g., 352 and 354) that electrically couple diamonds 306, 308, and 310 together and diamonds 312, 314 and 316 together of sensor pattern 304 and does not electrically couple to sensor pattern 302. Specifically, the substantially opaque conductive material is disposed to create a conductive bridge 352 which electrically couples diamonds 306 with 308 of sensor pattern 304. Additionally, the substantially opaque conductive material is disposed to create a conductive bridge 354 which electrically couples diamonds 314 with 316. It is appreciated that diamonds 308 with 310 are also electrically coupled by a conductive bridge similar to bridge 354 while diamonds 314 with 312 are electrically coupled by a conductive bridge similar to bridge 352. In this manner, diamonds 306, 308 and 310 of sensor pattern 304 are electrically coupled while diamonds 312, 314 and 316 are electrically coupled.

In this manner, a single layer of substantially transparent conductive material can be utilized in order to fabricate a two-dimensional capacitive sensing device. It is noted that by including the layer of substantially opaque conductive material over the substantially transparent conductive material, the substantially transparent conductive material is protected from damage during manufacture and/or repetitive use of the capacitive sensing device. Additionally, the substantially opaque conductive material can also provide electrical redundancy for the substantially transparent conductive material if the substantially transparent conductive material fails. Therefore, a more reliable and thinner capacitive sensor device can be fabricated.

It is noted that a substantially transparent insulator can be disposed over capacitive sensor 300B in order to provide a layer of protection for capacitive sensor patterns 302 and 304 along with the conductive bridges (e.g., 352 and 354).

Within FIG. 3B, insulator 350 can be implemented in a wide variety of ways in accordance with the present embodiment. For example, insulator 350 can be implemented as, but is not limited to, a substantially transparent material, a substantially opaque material, an opaque material, and/or a printed dielectric material. Additionally, the substantially opaque conductive material utilized to create the conductive bridges (e.g., 352 and 354) can be implemented in diverse ways in accordance with the present embodiment. For example, the substantially opaque conductive material can be implemented as, but not limited to, conductive ink (e.g., silver ink, carbon ink, mixture of silver and carbon inks, and the like). It is noted that conductive bridges (e.g., 352 and 354) can be implemented in diverse ways in accordance with the present embodiment. For example, conductive bridges (e.g., 352 and 354) can be implemented as, but is not limited to, a substantially transparent conductive material, a substantially opaque conductive material, and/or an opaque conductive material.

It is understood that the substantially opaque conductive material, substantially transparent conductive material, conductive bridges, and/or insulators described herein can be disposed by utilizing, but not limited to, one or more deposition processes such as a screen printing process, one or more lithographical processes such as an etching process, a combination of deposition and lithographical processes, and the like.

Figure 4:
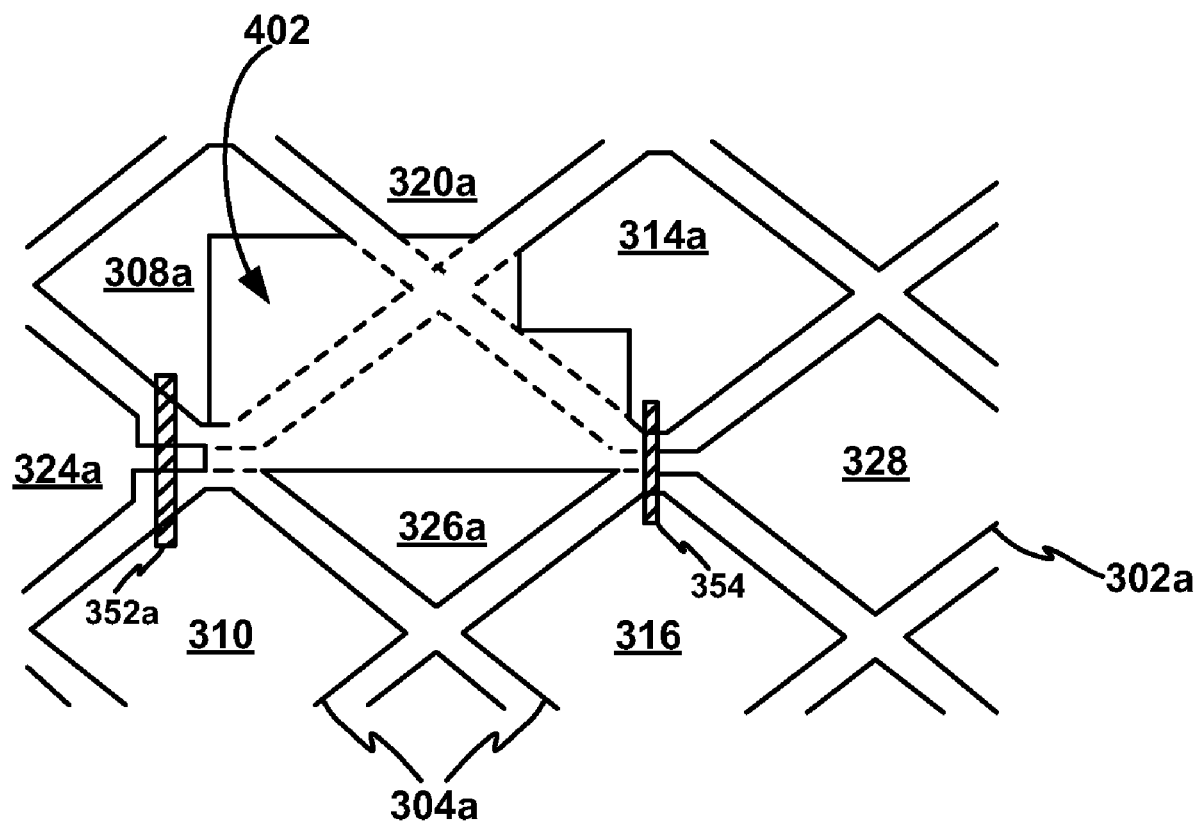
FIG. 4 is a diagram of an exemplary capacitive sensing device that illustrates selective disposing of substantially opaque conductive material in accordance with an embodiment of the present invention.

FIG. 4 is a diagram of an exemplary capacitive sensing device 400 that illustrates selective disposing of substantially opaque conductive material in accordance with an embodiment of the present invention. It is noted that capacitive sensing device 400 can be fabricated in a manner similar to capacitive sensor patterns 300A and 300B of FIGS. 3A and 3B, respectively, as described herein. The solid lines of capacitive sensing device 400 represent the substantially opaque conductive material while the dashed lines represent the underlying substantially transparent conductive material within an "illumination" opening 402 of capacitive sensing device 400. In this manner, light is able to pass through opening 402 of capacitive sensing device 400 in order to illuminate one or more keys (e.g., 204) of a keypad (e.g., 206) associated with an electronic device (e.g., 100) while still providing capacitive sensing capabilities within opening 402 via the existing substantially transparent conductive material. It is understood that the underlying substantially transparent conductive material extends beneath the substantially opaque conductive material.

Within capacitive sensing device 400, the substantially opaque conductive material of shapes 308a, 320a, 314a and 326a have been selectively disposed in order to create opening 402. Additionally, substantially opaque conductive material shape 324a has been selectively disposed such that it minimizes capacitive interference to conductive bridge 352a. In this manner, one or more patterns of substantially opaque conductive material can be tailored in order to minimize capacitive interference with one or more conductive bridges (e.g., 352a and/or 354). It should be understood for purpose of the present application the term "minimize capacitive interference" is intended to refer to disposing the conductive bridges in an orientation and location for reducing capacitive coupling between the conductive bridges and one or more proximate conductive sensor patterns.

Within FIG. 4, it is noted that the capacitive sensor patterns 302a and 304a of capacitive sensing device 400 operate in manner similar to capacitive sensor patterns 302 and 304 of FIGS. 3A and 3B, described herein.

Figure 5:
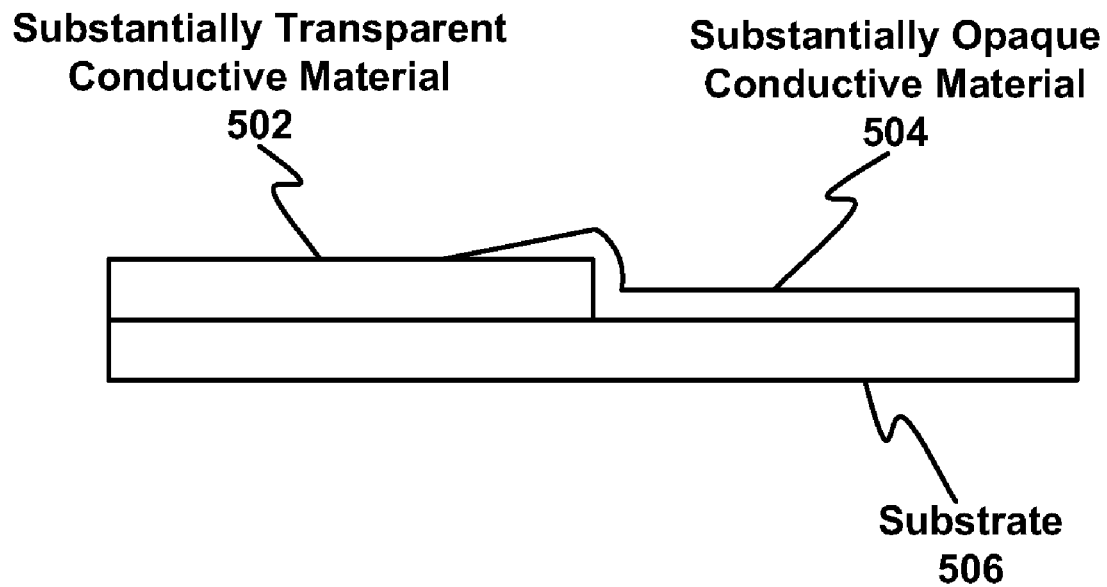
FIG. 5 is a side section view of an exemplary capacitive sensing device in accordance with an embodiment of the present invention.

FIG. 5 is a side section view of an exemplary capacitive sensing device 500 wherein a substantially opaque conductive material 504 is electrically coupled to at least a second portion of a substantially transparent conductive material 502 within a capacitive sensor pattern that includes conductive sensors in accordance with an embodiment of the present invention. Specifically, it is pointed out that within capacitive sensing device 500, the substantially opaque conductive material 504 and the substantially transparent material 502 are substantially within the same layer as they both are disposed above a substantially transparent substrate 506. In this manner, the combination of the substantially transparent material 502 and the substantially opaque conductive material 504 are able to create one or more capacitive sensor traces of a capacitive sensor pattern that operates in manner similar to capacitive sensor patterns 208, 300A, 300B and/or 400.

It is noted that a finger (e.g., 202) of a user could be on either side of capacitive sensing device 500 when it is in used. As such, capacitive sensing device 500 could be oriented such that substrate 506 is located above substantially transparent conductive material 502 and substantially opaque conductive material 504 or vice-versa. Hence, it is understood that when it is mentioned that something is "above" something else, it is typically in reference to the orientation of the Figures.

It is noted that a capacitive sensor device (e.g., 500) that operates in a manner similar to capacitive sensor device 400 can be fabricated such that the light openings (e.g., 402) are created with substantially transparent conductive material 502 while the remainder of capacitive sensor device 500 is created with substantially opaque conductive material 504. In this fashion, the substantially opaque conductive material 504 would not be located above the substantially transparent conductive material 502, but instead would be situated within substantially the same layer or plane as illustrated within capacitive sensor device 500 of FIG. 5. In this manner, the substantially opaque conductive material 504 and the substantially transparent conductive material 502 would substantially abut each other.

Within FIG. 5, it is noted that the substantially transparent flexible substrate 506 of the present embodiment may be implemented in a wide variety of ways. For example, the substantially transparent flexible substrate 506 can be implemented with, but is not limited to, PET. Additionally, the substantially transparent flexible substrate 506 can have a diverse range of thickness which provide a desired amount of flexibility. For example, the substantially transparent flexible substrate 506 can have a thickness of, but is not limited to, roughly 0.07 mm. Additionally, the substantially transparent conductive material 502 can be implemented in diverse ways such as, but not limited to, ITO or any other substantially transparent conductive material. Furthermore, the substantially opaque conductive material 504 can be implemented in a wide variety of ways in accordance with the present embodiment. For example, the substantially opaque conductive material 504 can be implemented as, but not limited to, conductive ink (e.g., silver ink, carbon ink, mixture of silver and carbon inks, and the like).

Figure 6:
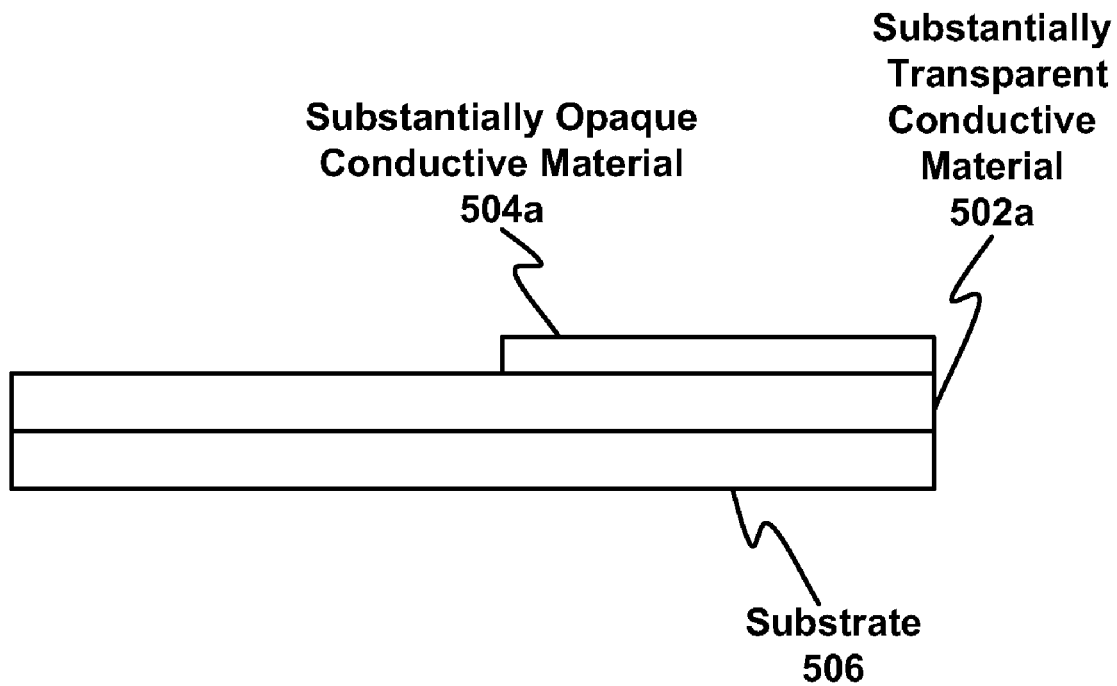
FIG. 6 is a side section view of an exemplary capacitive sensing device in accordance with an embodiment of the present invention.

FIG. 6 is a side section view of an exemplary capacitive sensing device 600 wherein a substantially opaque conductive material 504a overlies a pattern of substantially transparent conductive sensors 502a in accordance with an embodiment of the present invention. Specifically, a first portion of the substantially opaque conductive material 504a overlies at least a portion of a pattern of conductive sensors that include substantially transparent conductive material 502a. It is understood that within capacitive sensing device 600, the substantially opaque conductive material 504a overlies (or lies above) the substantially transparent material 502a. In this manner, the combination of the substantially transparent material 502a and the substantially opaque conductive material 504a of capacitive sensing device 600 have a similar structure as capacitive sensor patterns 300A, 300B and/or 400. As such, capacitive sensing device 600 operates in a manner similar to capacitive sensor patterns 300A, 300B and/or 400, as described herein.

Within capacitive sensing device 600, the substantially transparent material 502a is disposed above the substantially transparent flexible substrate 506 while the substantially opaque conductive material 504a is disposed above the substantially transparent material 502a.

Within FIG. 6, it is noted that the substantially transparent flexible substrate 506 of the present embodiment may be implemented in a wide variety of ways. For example, the substantially transparent flexible substrate 506 can be implemented with, but is not limited to, PET. Additionally, the substantially transparent flexible substrate 506 can have a diverse range of thickness which provide a desired amount of flexibility. For example, the substantially transparent flexible substrate 506 can have a thickness of, but is not limited to, roughly 0.07 mm. Furthermore, the substantially transparent conductive material 502a can be implemented in diverse ways such as, but not limited to, ITO or any other substantially transparent conductive material. Moreover, the substantially opaque conductive material 504a can be implemented in a wide variety of ways in accordance with the present embodiment. For example, the substantially opaque conductive material 504a can be implemented as, but not limited to, conductive ink (e.g., silver ink, carbon ink, mixture of silver and carbon inks, and the like).

Figure 7A:
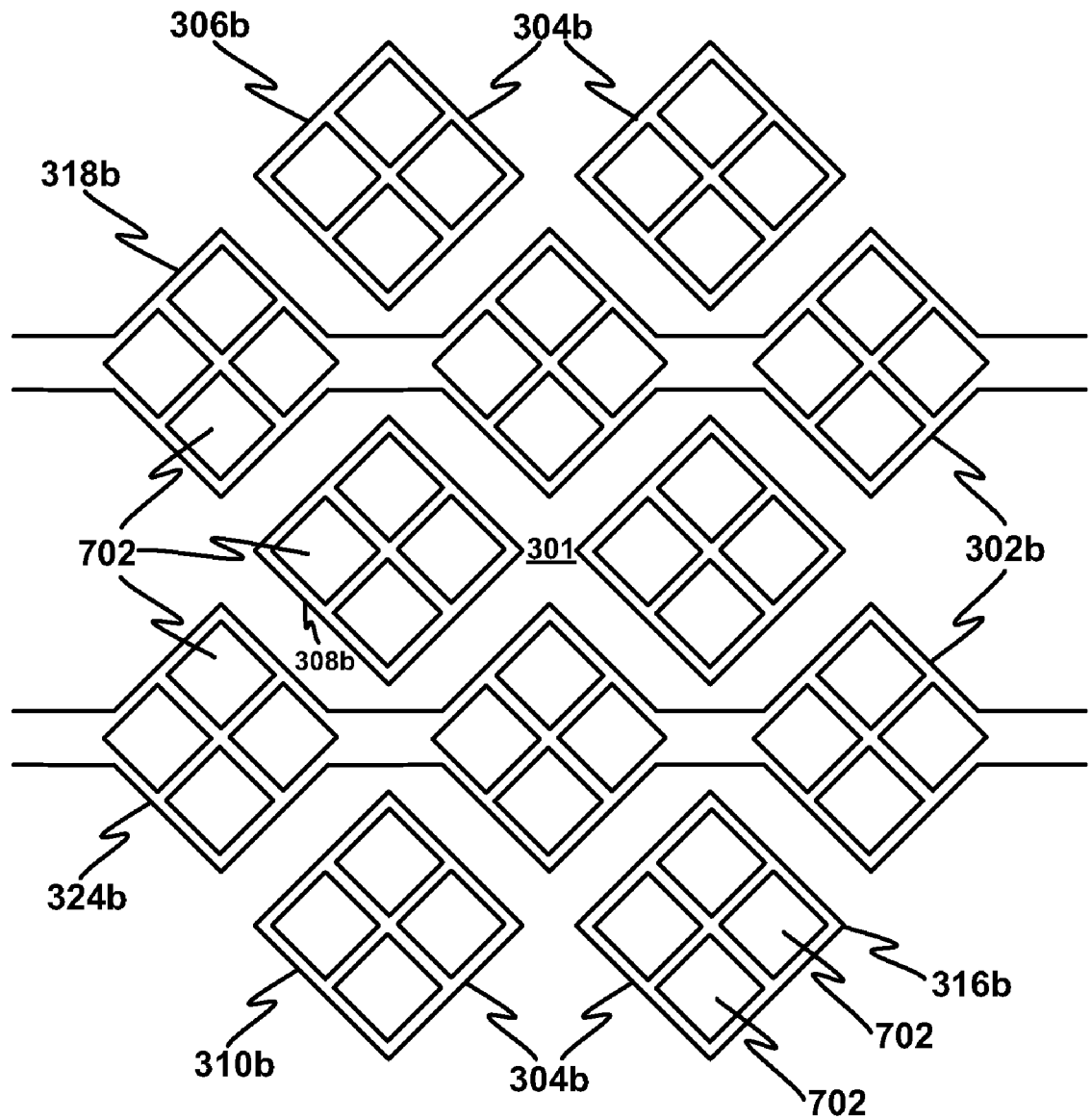
FIG. 7A is a diagram of an intermediate step in constructing an exemplary sensor that includes first and second sensor patterns in accordance with an embodiment of the present invention for a capacitive sensing device.

FIG. 7A is a diagram of an intermediate step in constructing an exemplary sensor 700A that includes a first capacitive sensor pattern 302b and a second capacitive sensor pattern 304b in accordance with an embodiment of the present invention for a capacitive sensing device. It is noted that capacitive sensor 700A can be fabricated in a manner similar to capacitive sensor 300A of FIG. 3A, described herein. However, it is noted that the substantially opaque conductive material of capacitive sensor 700A has been selectively disposed above the substantially transparent conductive material similar to a lattice design that includes openings (e.g., 702). In this manner, a greater amount of light is able to pass through openings 702 of capacitive sensing 700A in order to more fully illuminate one or more keys (e.g., 204) of a keypad (e.g., 206) associated with an electronic device (e.g., 100).

It is noted that the openings 702 of capacitive sensor patterns 302b and 304b are disposed such that the sensing ability of capacitive sensing device 700A is unaffected. It is understood that the substantially opaque conductive material of the present embodiment can be disposed by utilizing, but is not limited to, a screen printing process, lithographical process, and the like. Furthermore, the substantially opaque conductive material of other embodiment described herein can also be disposed by utilizing, but is not limited to, a screen printing process, lithographical process, and the like.

Within FIG. 7A, it is noted that the substantially transparent flexible substrate 301 of the present embodiment may be implemented in a wide variety of ways. For example, the substantially transparent flexible substrate 301 can be implemented with, but is not limited to, PET. Additionally, the layer of substantially transparent conductive material of both capacitive sensor patterns 302 and 304 can be implemented in diverse ways such as, but not limited to, ITO or any other substantially transparent conductive material. Furthermore, the layer of substantially opaque conductive material can be implemented in a wide variety of ways in accordance with the present embodiment. For example, the substantially opaque conductive material can be implemented as, but not limited to, conductive ink (e.g., silver ink, carbon ink, mixture of silver and carbon inks, and the like).

Figure 7B:
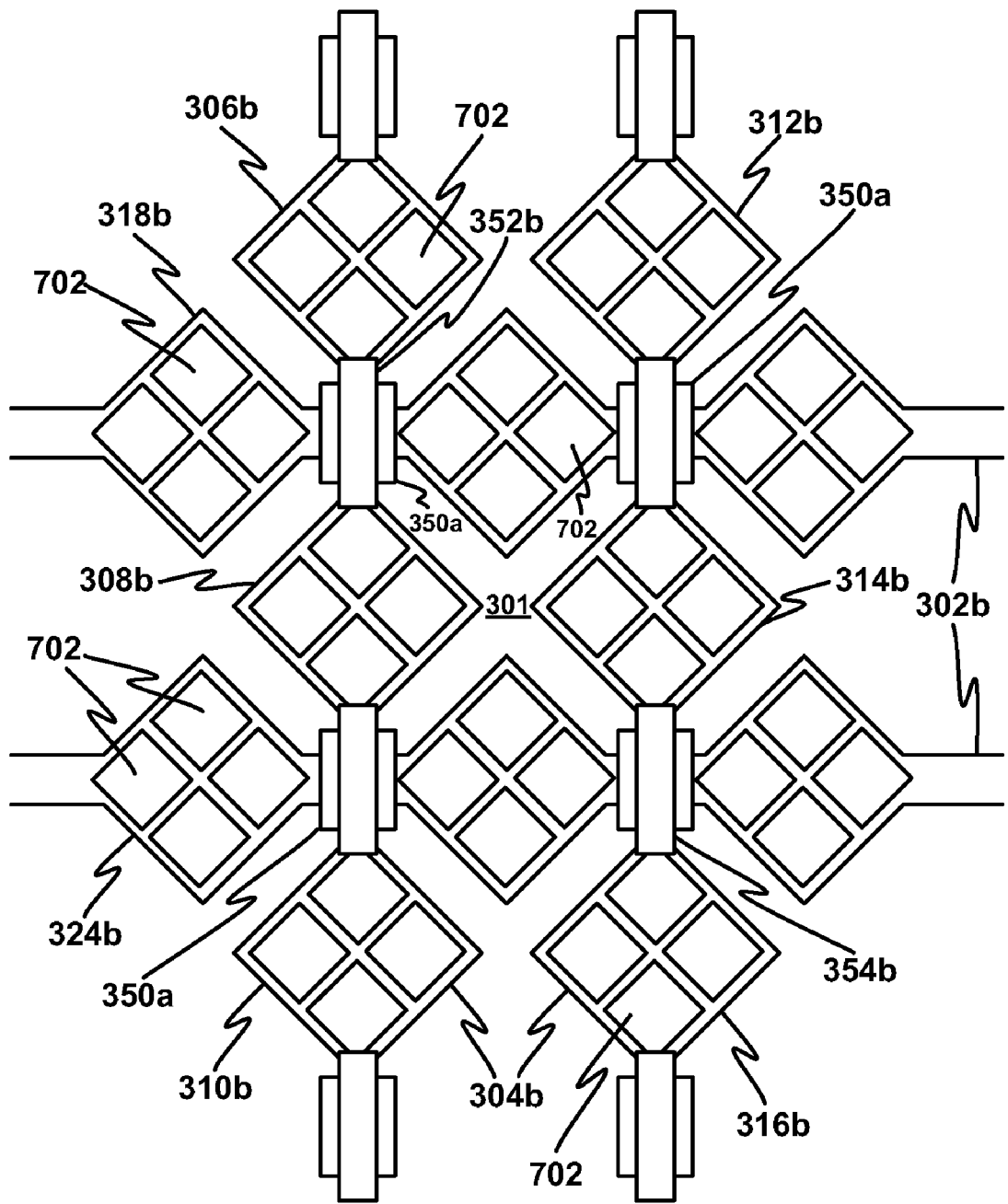
FIG. 7B is a diagram of is an exemplary sensor pattern that includes conductive bridges in accordance with an embodiment of the present invention for a capacitive sensing device.

FIG. 7B is a diagram of an exemplary capacitive sensor 700B that includes conductive bridges (e.g., 352b and 354b) in accordance with an embodiment of the present invention for a capacitive sensing device. Specifically, capacitive sensor 700B illustrates one embodiment of electrically coupling isolated diamonds 306b, 308b, 310b, 312b, 314b and 316b of capacitive sensor pattern 304b during a fabrication process of a capacitive sensing device. It is noted that capacitive sensor 700B can be fabricated in a manner similar to capacitive sensor 300B of FIG. 3B, described herein. However, the conductive bridges (e.g., 352b and 354b) can be selectively disposed in order to electrically couple the lattice design of the substantially opaque conductive material of isolated diamonds 306b, 308b, 310b, 312b, 314b and 316b. As part of fabricating one or more conductive bridges (e.g., 352b and 354b), it can be desirable to utilize a minimum overlap area to provide sufficient electrical coupling between adjacent diamonds (e.g., 314b and 316b).

When fabrication of capacitive sensor 700B has been completed, an increased amount of light can pass through openings 702 of capacitive sensor 700B as compared to capacitive sensor 300B (FIG. 3B) thereby more fully illuminating one or more keys (e.g., 204) of a keypad (e.g., 206) associated with an electronic device (e.g., 100).

It is noted that a substantially transparent insulator can be disposed over capacitive sensor 700B in order to provide a layer of protection to capacitive sensor patterns 302b and 304b along with the conductive bridges (e.g., 352b and 354b).

Within FIG. 7B, insulator 350a can be implemented in a wide variety of ways in accordance with the present embodiment. For example, insulator 350a can be implemented as, but is not limited to, a substantially transparent material, a substantially opaque material, an opaque material, and/or a printed dielectric material. Furthermore, the substantially opaque conductive material utilized to create the conductive bridges (e.g., 352b and 354b) can be implemented in diverse ways in accordance with the present embodiment. For example, the substantially opaque conductive material can be implemented as, but not limited to, conductive ink (e.g., silver ink, carbon ink, mixture of silver and carbon inks, and the like).

Figure 8:
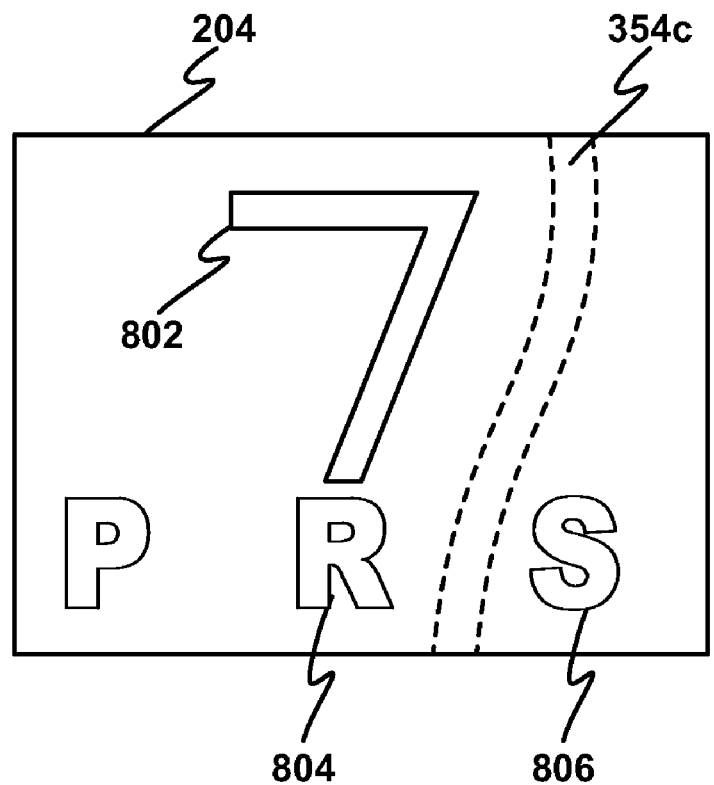
FIG. 8 is a diagram of an opaque conductive ink bridge in accordance with an embodiment of the present invention.

FIG. 8 is a top view diagram of a substantially opaque conductive material bridge (e.g., 354c) in accordance with an embodiment of the present invention that is routed to minimize visual interference with indicia (e.g., 802, 804 and 806) of a key (e.g., 204) of an electronic device (e.g., 100). It is noted that conductive bridges (e.g., 354c, 354b, 354a, 352b, 352a, 352, and 354) can each be fabricated as desired having, but not limited to, any length, width, shape, and/or routing path. As such, conductive bridge 354c of system 800 has been fabricated such that it is routed so that its visual inference with indicia 802, 804 and 806 is minimized while electrically coupling two or more diamonds (e.g., 314b and 316b), not shown. It should be understood for purpose of the present application the term "minimize visual interference with indicia" is intended to refer to disposing the conductive bridges in an orientation and location for lessening visual interference with proximate indicia while providing electrical coupling. In this manner, a user of an electronic device (e.g., 100) is able to easily read its keys 204 when they are illuminated from behind.

Figure 9:
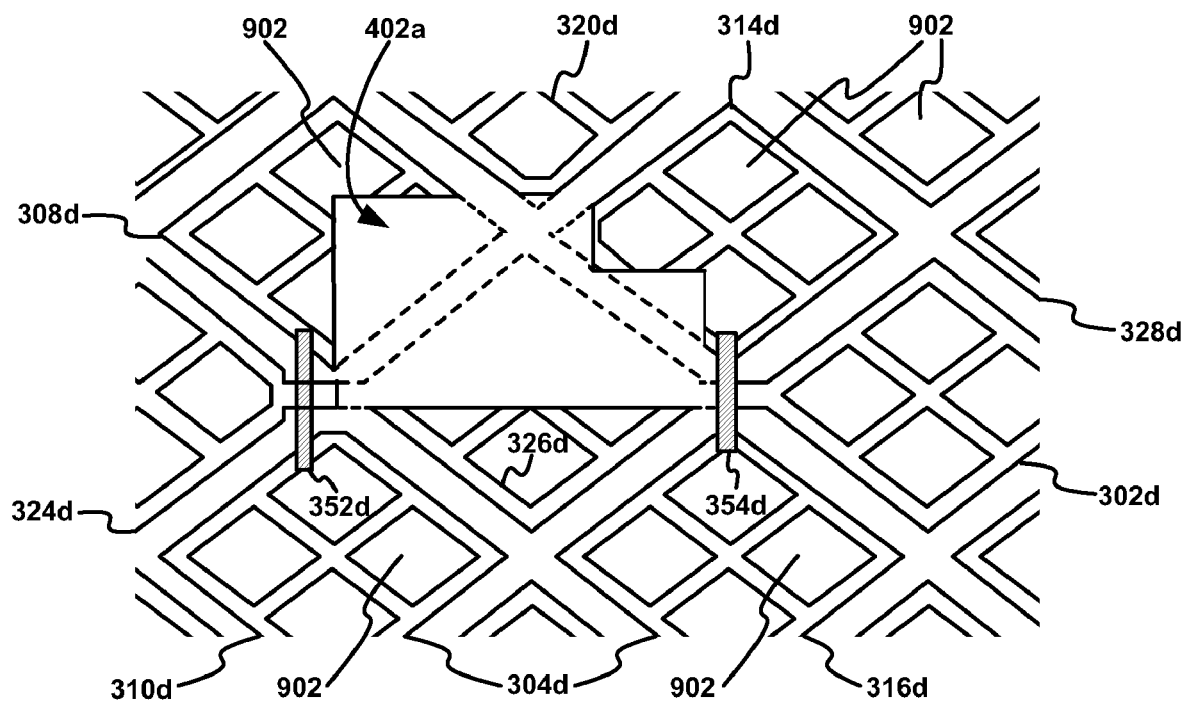
FIG. 9 is a diagram of an exemplary capacitive sensing device that illustrates selective disposing of substantially opaque conductive material in accordance with an embodiment of the present invention.

FIG. 9 is a diagram of selectively disposing an exemplary capacitive sensing device 900 that illustrates selective disposing of substantially opaque conductive material in accordance with an embodiment of the present invention. It is noted that capacitive sensing device 900 can be fabricated in a manner similar to capacitive sensor patterns 700A and 700B of FIGS. 7A and 7B, respectively, as described herein. The solid lines of capacitive sensing device 900 represent the substantially opaque conductive material while the dashed lines represent the underlying substantially transparent conductive material within an "illumination" opening 402a of capacitive sensing device 900. In this manner, light is able to pass through opening 402a of capacitive sensing device 900 in order to illuminate one or more function keys (e.g., 204) of a keypad (e.g., 206) associated with an electronic device (e.g., 100) while still providing capacitive sensing capabilities within opening 402a via the existing substantially transparent conductive material. It is noted that the underlying substantially transparent conductive material extends beneath the substantially opaque conductive material and under openings 902.

Within capacitive sensing device 900, the substantially opaque conductive material of shapes 308d, 320d, 314d and 326d have been selectively disposed in order to create opening 402a along with a lattice of openings 902. Additionally, substantially opaque conductive material shape 324d has been selectively disposed such that it does not provide capacitive interference to conductive bridge 352d which electrically couples substantially opaque conductive material shapes 308d and 310d. In this manner, one or more patterns of substantially opaque conductive material can be tailored in order to minimize capacitive interference with one or more conductive bridges (e.g., 352d and/or 354d). It should be understood for purpose of the present application the term "minimize capacitive interference" is intended to refer to disposing the conductive bridges in an orientation and location for reducing capacitive coupling between the conductive bridges and one or more proximate conductive sensor patterns.

Within FIG. 9, it is noted that the capacitive sensor patterns 302d and 304d of capacitive sensing device 900 operate in manner similar to capacitive sensor patterns 302b and 304b of FIGS. 7A and 7B, described herein.

Figure 10:
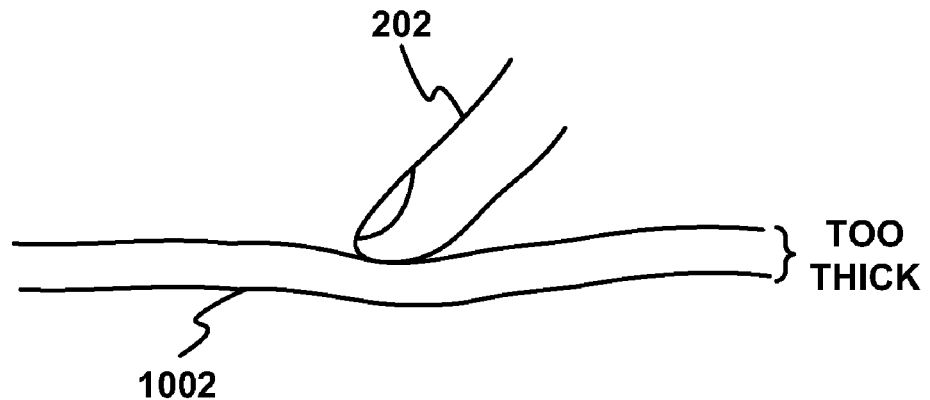
FIG. 10 is a diagram illustrating the flexibility of a capacitive sensing device in accordance with an embodiment of the present invention.
Figure 10:
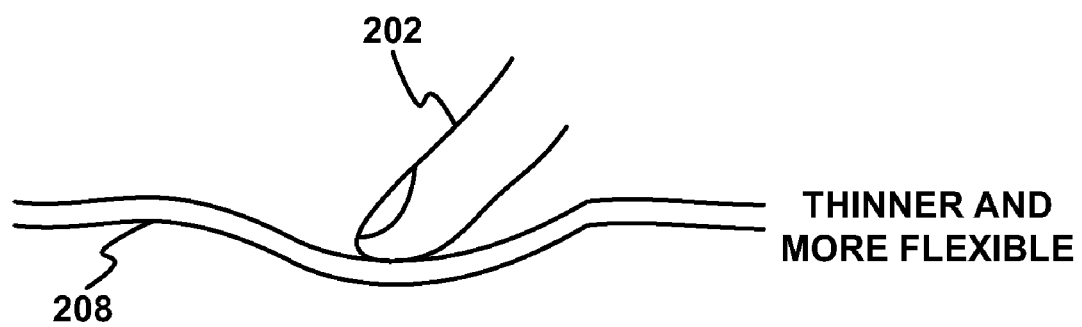

FIG. 10 is a diagram illustrating a flexibility comparison 1000 of a conventional capacitive sensing device 1002 and a capacitive sensing device 208 in accordance with an embodiment of the present invention. It is noted that capacitive sensing device 208 can be fabricated in any manner similar to that described herein. As such, capacitive sensing device 208 results in a thinner sensing device that has more flexibility thereby enabling the desired tactile response during use of keys of a keypad assembly. Specifically, when finger 202 exerts a downward force on capacitive sensing device 208, it flexes or bends more easily and further than the conventional capacitive sensor device 1002 when the same amount of downward force is exerted on it by finger 202. Therefore, capacitive sensing device 208 can be more desirable when implemented as part of a keypad assembly (e.g., 200).

Figure 11:
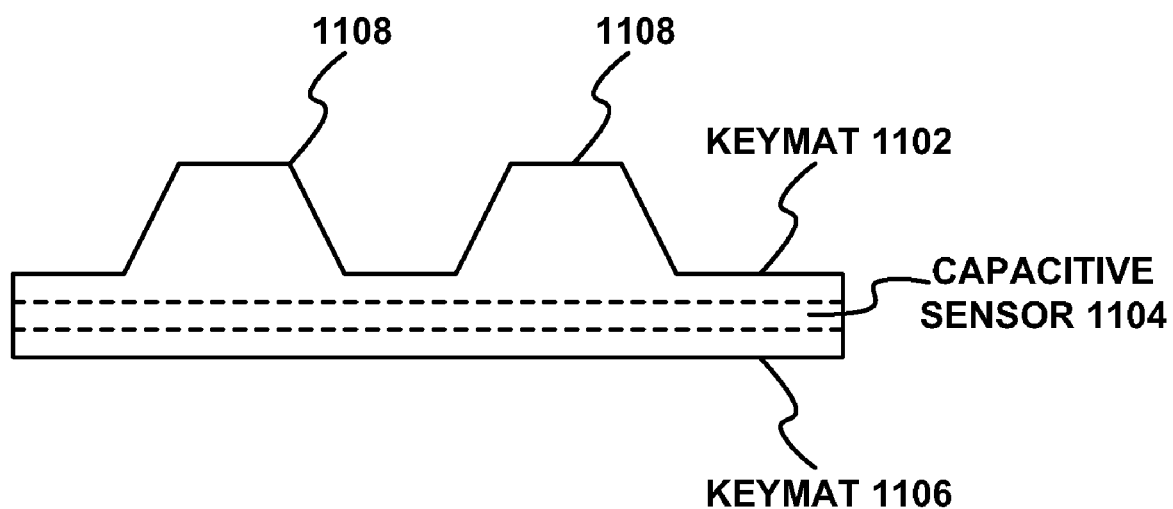
FIG. 11 is a side sectional view of a keymat that includes a capacitive sensing device in accordance with an embodiment of the present invention.

FIG. 11 is a side sectional view of an integrated keypad assembly in accordance with an embodiment of the present invention in which an integrated capacitive sensing device is integral to the keymat. Within keymat assembly 1100, which includes capacitive sensing device 1104, keys 1108 are formed as part of keymat portion 1102 which can be formed of a rubber material. It is noted that capacitive sensor device 1104 has been integrated within the rubber material of keymat assembly 1100. Specifically, keymat assembly 1100 includes a first keymat portion 1102 of rubber and a second keymat portion 1106 of rubber. As such, the capacitive sensor device 1104 is disposed between and within rubber portions 1102 and 1106. It is understood that keymat assembly 1100 operates in a manner similar to keypad assembly 202 of FIG. 2, described herein.

Figure 12:
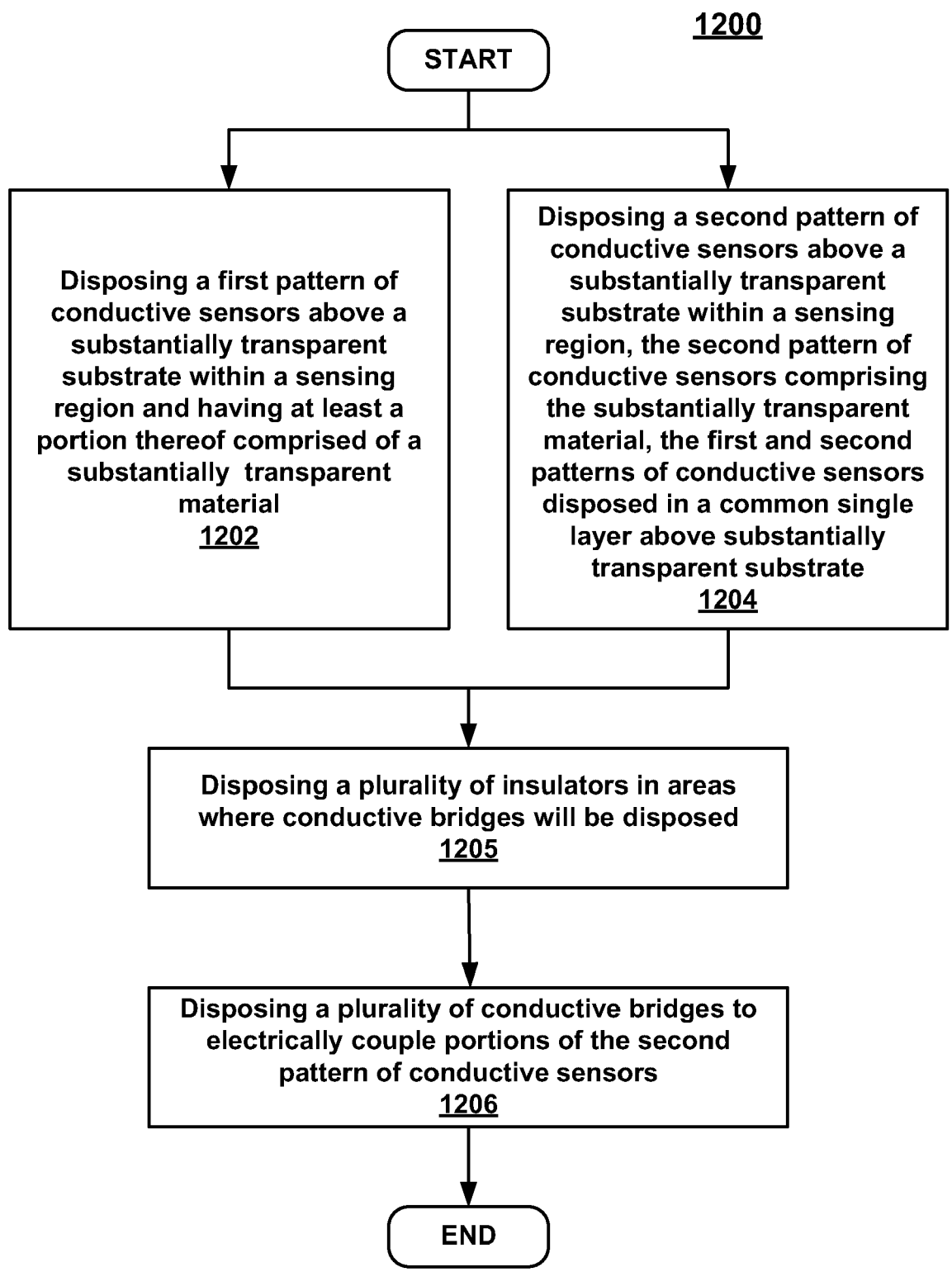
FIG. 12 is a flowchart of operations performed in accordance with an embodiment of the present invention for fabricating a capacitive sensing device.

FIG. 12 is a flowchart of operations performed in accordance with an embodiment of the present invention for fabricating a capacitive sensing device. Although specific operations are disclosed in flowchart 1200, such operations are exemplary. That is, the present embodiment is well suited to performing various other operations or variations of the operations recited in FIG. 12.

At operation 1202, a first pattern of conductive sensors is disposed above a substantially transparent substrate within a sensing region. The first pattern of conductive sensors has at least a portion thereof that includes a substantially transparent conductive material. It is noted that the disposing of the first pattern of conductive sensors at operation 1202 can also include disposing at least a first portion comprised of substantially opaque conductive material (e.g., conductive ink) that is electrically coupled to at least a second portion of the substantially transparent material (e.g., ITO) of the first pattern of conductive sensors. It is understood that the sensing region will be the area proximate to of the capacitive sensing device for which the capacitive sensing device is designed to actively "capture" pointing and/or gesturing inputs of a finger of a user when it is in proximity to the capacitive sensing device. Furthermore, the disposing of the first pattern of conductive sensors at operation 1202 can also include the first portion of the substantially opaque conductive material including openings formed therethrough such that light is able to pass through the openings of the substantially opaque conductive material. In one embodiment, the first portion of substantially opaque conductive material overlies at least a portion of the first pattern of conductive sensors.

The substantially transparent substrate can be implemented in diverse ways in accordance with the present embodiment. For example, the substantially transparent substrate can be implemented as, but is not limited to, a substantially transparent plastic substrate such as PET. Additionally, the substantially transparent conductive material can be implemented in a wide variety of ways in accordance with the present embodiment. For example, the substantially transparent conductive material can be implemented as, but is not limited to, indium tin oxide (ITO) or any other substantially transparent conductive material. Furthermore, the substantially opaque conductive material can be implemented in a diverse ways in accordance with the present embodiment. For example, the substantially opaque conductive material can be implemented as, but is not limited to, conductive ink, silver ink, carbon ink, a combination of silver and carbon inks, or any other substantially opaque conductive material.

At operation 1204 of FIG. 12, a second pattern of conductive sensors is disposed above the substantially transparent substrate within the sensing region. The second pattern of conductive sensors can also include, but is not limited to, the substantially transparent material. It is noted that the first pattern of conductive sensors and the second pattern of conductive sensors can be disposed in a common single layer above the substantially transparent substrate. In one embodiment, the disposing of the second pattern of conductive sensors can also include disposing at least a first portion comprised of substantially opaque conductive material that is electrically coupled to at least a second portion of the substantially transparent material of the second pattern of conductive sensors. In another embodiment, the first portion of substantially opaque conductive material of the second pattern of conductive sensors includes openings formed therethrough such that light is able to pass through the openings of the substantially opaque conductive material. Alternatively, the first portion of substantially opaque conductive material of the second pattern of conductive sensors overlies at least a portion of the second pattern of conductive sensors.

It is noted that operations 1202 and 1204 can occur concurrently or they can occur sequentially.

At operation 1205, a plurality of insulators is disposed in areas where conductive bridges will be disposed (at operation 1206) to cross sensor traces of the first pattern of conductive sensors to facilitate electrically coupling of portions of the second pattern of conductive sensors. It is noted that the plurality of insulators can be implemented of a wide variety of materials in accordance with the present embodiment. For example, the plurality of insulators can be implemented in any manner described herein, but are not limited to such.

At operation 1206, a plurality of conductive bridges is disposed to electrically couple portions of the second pattern of conductive sensors. It is noted that the plurality of conductive bridges can be implemented of a wide variety of materials in accordance with the present embodiment. For example, the plurality of conductive bridges can be implemented using, but is not limited to, an opaque conductive material and/or a substantially transparent conductive material. In one embodiment, the disposing of the plurality of conductive bridges is selectively disposed to lessen visual interference with indicia of keys of a keypad assembly.

In one embodiment of flowchart 1200, the first pattern of conductive sensors can be disposed to minimize capacitive interference with at least one of the plurality of conductive bridges.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A capacitive sensor comprising: a substantially transparent substrate; a first substantially transparent capacitive sensor trace and a plurality of isolated shapes disposed above said substantially transparent substrate in a common layer and in a single disposition process, wherein each of said plurality of isolated shapes is substantially transparent; insulator material disposed between at least two adjacent isolated shapes of said plurality of isolated shapes; and conductive material disposed above a portion of said plurality of isolated shapes and electrically coupling said at least two adjacent isolated shapes such that said at least two adjacent isolated shapes become configured to comprise a second substantially transparent capacitive sensor trace, said conductive material electrically insulated from said first substantially transparent capacitive sensor trace by said insulator material.

2. The capacitive sensor of claim 1, wherein said substantially transparent substrate is comprised of polyethylene terephthalate (PET).

3. The capacitive sensor of claim 1, wherein said substantially transparent substrate is flexible.

4. The capacitive sensor of claim 1, wherein said insulator material overlaps said first substantially transparent capacitive sensor trace, and wherein said conductive material overlaps both said insulator material and said first substantially transparent capacitive sensor trace.

5. The capacitive sensor of claim 1, wherein said first substantially transparent capacitive sensor trace is arranged in a first direction, and wherein said second substantially transparent capacitive sensor trace is arranged in a second direction different from said first direction, said capacitive sensor further comprising:

a third substantially transparent capacitive sensor trace disposed above said substantially transparent substrate, said third substantially transparent capacitive sensor trace arranged in said first direction;

a second plurality of isolated shapes disposed above said substantially transparent substrate, said second plurality of isolated shapes configured to comprise a fourth substantially transparent capacitive sensor trace arranged in said second direction;

insulator material disposed between at least two adjacent isolated shapes of said second plurality of isolated shapes; and conductive material electrically coupling said at least two adjacent isolated shapes of said second plurality of isolated shapes, said conductive material electrically insulated from said first and third substantially transparent capacitive sensor traces by said insulator material disposed between said at least two adjacent isolated shapes of said second plurality of isolated shapes.

6. The capacitive sensor of claim 1, wherein at least one of said first substantially transparent capacitive sensor trace and said second substantially transparent capacitive sensor trace is comprised of indium tin oxide (ITO).

7. The capacitive sensor of claim 1, wherein at least one of said first substantially transparent capacitive sensor trace and said second substantially transparent capacitive sensor trace is comprised of diamond shapes.

8. The capacitive sensor of claim 1, wherein said insulator material is substantially opaque.

9. The capacitive sensor of claim 1, wherein said insulator material is substantially transparent.

10. The capacitive sensor of claim 1, wherein said first substantially transparent capacitive sensor trace is formed using a lithographic process.

11. The capacitive sensor of claim 1, wherein said conductive material comprises at least one material selected from the group consisting of: silver ink, carbon ink, and a mixture of silver ink and carbon ink.

12. The capacitive sensor of claim 1, wherein said capacitive sensor is coupled to sensing circuitry to comprise a capacitive sensing device.

13. A method for providing a capacitive sensor, said method comprising: disposing a first substantially transparent capacitive sensor trace and a plurality of isolated shapes above a substantially transparent substrate in a common layer and in a single disposition process, wherein said first substantially transparent capacitive sensor trace is arranged in a first direction, and wherein each of said plurality of isolated shapes is substantially transparent; disposing an insulator between at least two adjacent isolated shapes of said plurality of isolated shapes; and electrically coupling said at least two adjacent isolated shapes with conductive material, such that said plurality of isolated shapes becomes configured to comprise a second substantially transparent capacitive sensor trace, wherein said second substantially transparent capacitive sensor trace is arranged in a second direction different from said first direction, said conductive material electrically insulated from said first substantially transparent capacitive sensor trace by said insulator.

14. The method for forming a capacitive sensor as recited in claim 13, wherein said substantially transparent substrate comprises a flexible substrate.

15. The method for forming a capacitive sensor as recited in claim 13, wherein said disposing said insulator comprises printing a dielectric to form said insulator.

16. The method for forming a capacitive sensor as recited in claim 13, wherein said disposing said first substantially transparent capacitive sensor trace above said substantially transparent substrate comprises:

disposing said first substantially transparent capacitive sensor trace using at least one process selected from the group consisting of: printing and lithography processes.

17. A capacitive sensor comprising: a substantially transparent substrate; a first pattern of conductive shapes adapted for forming a first set of capacitive sensor traces arranged along a first direction, said first pattern of conductive shapes disposed above said substantially transparent substrate and comprised of a substantially transparent material; a second pattern of conductive shapes comprising a plurality of isolated shapes, said second pattern of conductive shapes comprised of said substantially transparent material, wherein said plurality of isolated shapes and said first pattern of conductive shapes are in a common layer that is disposed above said substantially transparent substrate in a single common disposition process; a conductive material electrically coupling isolated shapes of said plurality of isolated shapes to form a second set of capacitive sensor traces arranged along a second direction different from said first direction; and an insulator material disposed between said first pattern of conductive shapes and said conductive material, said insulator material configured to electrically insulate said first pattern of conductive shapes from said conductive material.

18. The capacitive sensor of claim 17, wherein said substantially transparent substrate is flexible.

19. The capacitive sensor of claim 17, wherein at least one of said first pattern of conductive shapes and said second pattern of conductive shapes is comprised of diamond-shapes.

20. The capacitive sensor of claim 17, wherein said first set of capacitive sensor traces and said second set of capacitive sensor traces are orthogonal to each other.

21. The capacitive sensor of claim 17, wherein said insulator material is substantially opaque.

22. A method for providing a capacitive sensor, said method comprising: disposing a first pattern of capacitive sensor traces and a second pattern of capacitive sensor traces above a substantially transparent substrate in a common layer and in a single common disposition process, said first pattern of capacitive sensor traces and said second pattern of capacitive sensor traces comprised of a substantially transparent material, disposing an insulator material over said substantially transparent substrate, wherein said insulator material overlaps said first pattern of capacitive sensor traces in said capacitive sensor; and disposing a conductive material for electrically coupling portions of said second pattern of capacitive sensor traces over said substantially transparent substrate, wherein said conductive material overlaps both said insulator material and said first pattern of capacitive sensor traces in said capacitive sensor.

23. The method for providing said capacitive sensor as recited in claim 22, wherein said disposing said insulator material comprises:
disposing said insulator material over said first pattern of capacitive sensor traces.

24. The method for providing said capacitive sensor as recited in claim 22, wherein said disposing said insulator material comprises:
disposing a substantially opaque insulator, said substantially opaque insulator configured to electrically insulate said first pattern of capacitive sensor traces and said conductive material.

25. The method for providing said capacitive sensor as recited in claim 22, wherein said disposing said insulator comprises:
disposing a substantially transparent insulator, said substantially transparent insulator configured to electrically insulate said first pattern of capacitive sensor traces and said conductive material.

26. The method as recited in claim 22, wherein at least one of said first pattern of capacitive sensor traces and said second pattern of capacitive sensor traces comprises conductive material disposed around an opening.

27. The method as recited in claim 26, wherein said conductive material disposed around said opening forms part of a lattice shape.

28. The capacitive sensor of claim 1, wherein at least one of said first substantially transparent capacitive sensor trace and said second substantially transparent capacitive sensor trace comprises conductive material disposed around an opening.

29. The capacitive sensor of claim 28, wherein said conductive material disposed around said opening forms part of a lattice shape.

30. The capacitive sensor of claim 1, wherein said single common disposition process is selected from the disposition processes consisting of: a screen printing process and a lithographic process.

31. The method as recited in claim 13, wherein said disposing a first substantially transparent capacitive sensor trace and a plurality of isolated shapes above a substantially transparent substrate in a common layer in a single common disposition process comprises: disposing said first substantially transparent capacitive sensor and said plurality of isolated shapes above said substantially transparent substrate in a common layer utilizing a disposition process selected from the disposition processes consisting of: a screen printing process and a lithographic process.

32. The capacitive sensor of claim 17, wherein said single common disposition process is selected from the disposition processes consisting of: a screen printing process and a lithographic process.

33. The method as recited in claim 22, wherein said disposing a first pattern of capacitive sensor traces and a second pattern of capacitive sensor traces above a substantially transparent substrate in a common layer and in a single common disposition process comprises: disposing said first pattern of capacitive sensor traces and said second pattern of capacitive sensor traces above said substantially transparent substrate in said common layer utilizing a disposition process selected from the disposition processes consisting of: a screen printing process, and a lithographic process.

* * * * *